June 28, 1955 F. R. ECK 2,711,871
RESILIENT MOUNTING STRUCTURE
Original Filed April 16, 1951
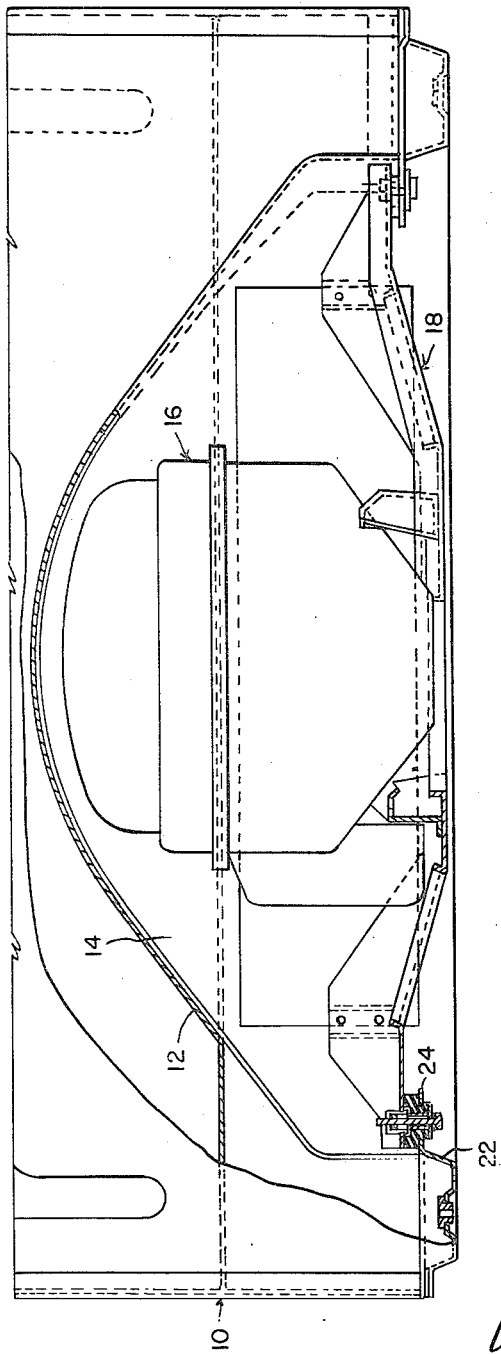
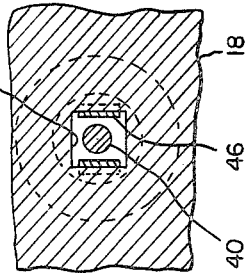
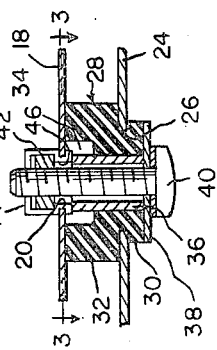
INVENTOR.
FLOYD R. ECK
BY
*Whittemore, Hulbert & Belknap*
ATTORNEYS

United States Patent Office 2,711,871
Patented June 28, 1955

2,711,871

RESILIENT MOUNTING STRUCTURE

Floyd R. Eck, Des Plaines, Ill., assignor to Motor Products Corporation, Detroit, Mich., a corporation of New York Original application April 16, 1951, Serial No. 221,302. Divided and this application July 14, 1952, Serial No. 298,751

1 Claim. (Cl. 248—22)

The present invention relates to resilient mounting structure, and more particularly to resilient mounting structure designed to provide a shock and vibration absorbing mounting for operating mechanism such for example as the operating mechanism of a refrigerator unit.

The present application is a division of my prior co-pending application, Serial No. 221,302, filed April 16, 1951, now Patent No. 2,685,178.

It is an object of the present invention to provide mounting structure adapted to support a part from a rigid base with provision for yielding movement in any direction and in a manner to absorb shock and vibration.

More specifically, it is an object of the present invention to provide mounting structure supporting a movable part from a fixed base which includes a grommet of resilient material including means for placing the grommet under compression.

It is a further object of the present invention to provide in support structure of the character described a tubular grommet of resilient yieldable material, means for supporting a movable part from the upper surface of the grommet, means for applying pressure between the movable part and grommet, and means for supporting the grommet at an intermediate portion thereof from a fixed base.

Other objects and features of the invention will become apparent as the description proceeds, especially when taken in conjunction with the accompanying drawings, wherein:

Figure 1 is an elevational view partly in section of a refrigerator or the like, showing the resilient mounting structure as supporting a motor compressor unit.

Figure 2 is an enlarged vertical sectional view through the mounting structure.

Figure 3 is a section on the line 3—3, Figure 2.

In Figure 1 there is shown at 10 a portion of a refrigerator or the like, having a bottom wall 12 shaped to provide an opening 14 for the reception of a motor compressor unit indicated generally at 16. The motor compressor unit is supported on a part 18 which is in the form of a sheet metal plate having openings 20 adjacent the corners thereof. The refrigerator 10 includes rigid support portions 22 including inwardly extending flanges 24 provided with openings 26. The openings 26 are circular in cross-section but the opening 20, as best seen in Figure 3, is of non-circular cross-section and conveniently may be square as illustrated in the figure. The mounting part or plate 18 is located with the opening 20 spaced vertically above the opening 26 provided in the flanges 24.

The resilient mounting structure which supports the part 18 from the base supports 22 comprises a tubular grommet 28 formed of a resilient material such for example as rubber. The grommet 28 is provided with annular grooves or slots which receive the portions of the support members surrounding the openings 26 therein. The portion 30 of the grommet below its annular slot is smaller than the portion 32 of the grommet above the annular slot. Moreover, the grommet has an opening therethrough, the opening being laterally enlarged adjacent the top of the grommet as indicated at 34. Disposed within the opening through the grommet is a tubular spacer 36 and at the underside of the grommet is a washer 38 of a size corresponding to the diameter of the lower portion 30 of the grommet. Moreover, it will be observed that the washer 38 extends outwardly so as to underlie the portions of the support members 24 surrounding the openings 26 in the support members.

Suitable means are provided which in effect compress the resilient material of the grommet 28 between the washer 38 and the underside of the supporting part 18. Specifically, this means comprises a nut and bolt assembly adapted to apply pressure between the underside of the washer 38 and the upper side of the supporting part 18. In practice, the nut and bolt assembly comprises the bolt 40, the nut 42, and the cage 44 for the nut, the cage having hook portions 46 which engage opposite edges of the square opening 20 in the supported part. When the nut and bolt are tightened the tubular spacer 36 constitutes a limiting abutment which determines the compression applied to the grommet 38 between the supported member 18 and the washer 38. Actually, physical abutment takes place between the upper end of the spacer 36 and the bottom tangs on the cage 44 but the same result could of course be accomplished by omitting the cage 44 and taking bearing directly between the upper end of the tubular spacer 36 and the underside of the supported part 18 surrounding the opening 20 therein.

The foregoing structure is particularly advantageous in that the supported part 18 has no rigid mechanical connection whatever with the supporting structure 24. Moreover, by predetermining the length of the tubular spacer, a definite and controlled amount of compressive force may be applied to the grommet before abutment takes place limiting approach between the washer 38 and the support part 18. Thus, the resilient means is prestressed to any desired amount and while it remains a yieldable resilient support, nevertheless it is preloaded to a desired degree to produce the required characteristics. It will of course be understood that in Figure 2 the gasket or grommet 28 is shown under compression and that prior to tightening the nut and bolt assembly, the upper end of the tubular spacer 36 will be out of engagement with the underside of the plate 18 or, as illustrated in the figure, with the underside of the hooks 46 of the nut cage 44.

The description and the foregoing specification constitute a description of the improved resilient mounting structure in such full, clear, concise and exact terms as to enable any person skilled in the art to practice the invention, the scope of which is indicated by the appended claim.

What I claim as my invention is:

Resilient mounting structure for resiliently mounting the corners of a refrigerating mechanism mounting plate on rigid supports each having a horizontal flange portion provided with an opening, the mounting plate having at each corner an opening above and in axial alignment with the opening in the adjacent flange: said mounting structure comprising a generally tubular resilient grommet having an annular groove at its exterior, the portion of said grommet below said groove being of substantially less diameter than the portion thereof above said groove, said grommet having a vertical opening extending axially therethrough, the upper end portion of the opening being laterally enlarged, the bottom of the lateral enlargement being located substantially above said annular groove, said grommet being supported with its groove in the opening in said flange portion with the larger diameter portion thereof above said flange, said plate resting directly upon the upper end of said grommet, threaded means carried by said mounting plate surrounding the opening therein, a bolt extending upwardly through said grommet and threaded in said threaded means, said bolt including abutment means at its lower end engaging the entire lower surface of said grommet, and a tubular spacer surrounding said bolt and engageable between said threaded means and said abutment means to provide a predetermined compression of said grommet when said bolt is tightened.

References Cited in the file of this patent

UNITED STATES PATENTS

| | | |
|---|---|---|
| 2,223,028 | Dobson | Nov. 26, 1940 |
| 2,361,184 | Ellis et al. | Oct. 24, 1944 |
| 2,401,449 | Yates | June 4, 1946 |
| 2,495,037 | Tinnerman | Jan. 17, 1950 |
| 2,520,757 | Cain | Aug. 29, 1950 |
| 2,611,574 | Davies et al. | Sept. 23, 1952 |

FOREIGN PATENTS

| | | |
|---|---|---|
| 103,226 | Australia | Feb. 8, 1938 |
| 463,322 | Canada | Feb. 11, 1950 |